(12) United States Patent
Rebiffe

(10) Patent No.: US 10,901,307 B2
(45) Date of Patent: Jan. 26, 2021

(54) HIGH-POWER PROJECTOR WITH OFFSET LASER SOURCE

(71) Applicant: XYZED, Paris (FR)

(72) Inventor: Maurice Rebiffe, Paris (FR)

(73) Assignee: XYZED, Paris (FR)

(\*) Notice: Subject to any disclaimer, the term of this patent is extended or adjusted under 35 U.S.C. 154(b) by 0 days.

(21) Appl. No.: 16/605,119

(22) PCT Filed: Apr. 11, 2018

(86) PCT No.: PCT/FR2018/050908
§ 371 (c)(1),
(2) Date: Oct. 14, 2019

(87) PCT Pub. No.: WO2018/189482
PCT Pub. Date: Oct. 18, 2018

(65) Prior Publication Data
US 2020/0159092 A1    May 21, 2020

(30) Foreign Application Priority Data
Apr. 14, 2017  (FR) ...................... 17 53306

(51) Int. Cl.
*G03B 21/20* (2006.01)
*G03B 21/00* (2006.01)
(Continued)

(52) U.S. Cl.
CPC ....... *G03B 21/006* (2013.01); *G02B 27/0905* (2013.01); *G02B 27/0994* (2013.01); *G03B 21/2033* (2013.01); *H04N 9/3152* (2013.01)

(58) Field of Classification Search
CPC .... G03B 21/006; G03B 21/008; G03B 21/28; G03B 21/2013; G03B 21/2033;
(Continued)

(56) References Cited

U.S. PATENT DOCUMENTS 7,355,657 B2 * 4/2008 Chilla .................. H04N 9/3114
348/744
7,854,521 B2 * 12/2010 Takahashi .............. G03B 21/26
353/122
(Continued)

FOREIGN PATENT DOCUMENTS

EP    1389018 A2    2/2004
GB    2462444 A     2/2010
(Continued)

OTHER PUBLICATIONS

French Search Report from FR Application No. 1753306, dated Dec. 22, 2017.
(Continued)

*Primary Examiner* — Sultan Chowdhury
(74) *Attorney, Agent, or Firm* — Workman Nydegger

(57) ABSTRACT

A projector including a plurality of laser light sources and a projection engine fitted at the inlet with an integrating tunnel in which these laser light sources are connected in an offset manner to the projection engine through a bundle of optical fibres including a plurality of inlets and a single outlet, the bundle of fibres being fused at each of the inlets and the single outlet to eliminate the inter-fibre spaces therefrom, the inlets, fused in this way, of the bundle of fibres, being disposed at the focal planes of the outputs of the laser light sources and the single outlet, fused in this way, of the bundle of fibres, being placed in direct contact with the integrating tunnel via a homogenising plate.

11 Claims, 1 Drawing Sheet

Figure 1:
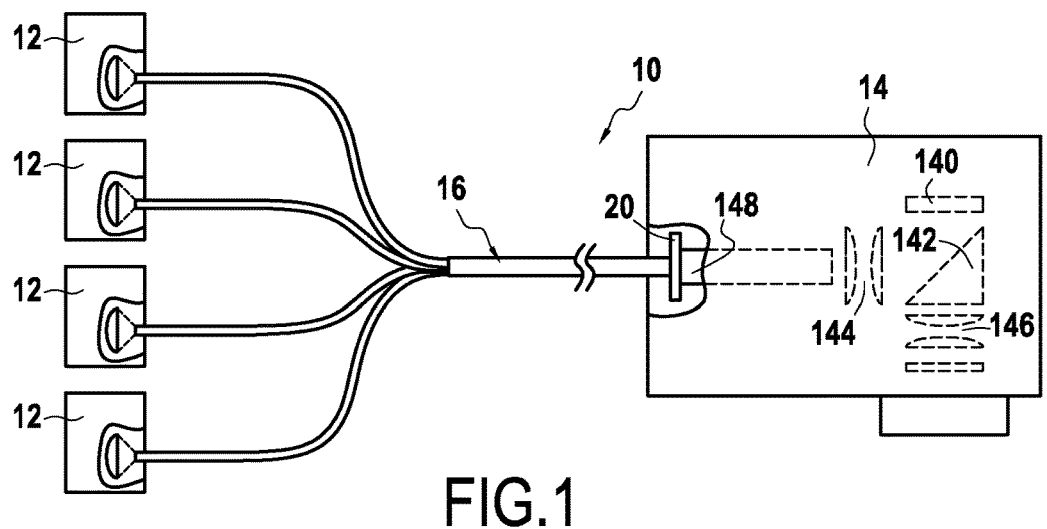

(51) Int. Cl.
*G02B 27/09* (2006.01)
*H04N 9/31* (2006.01)

(58) Field of Classification Search
CPC ............ G03B 21/2053; H04N 9/3138; H04N 9/3152; H04N 9/3161; H04N 9/3164; H04N 9/3197; G02B 27/0905; G02B 27/0944; G02B 27/0994; G02B 27/1033
See application file for complete search history.

(56) References Cited

U.S. PATENT DOCUMENTS

| | | |
|---|---|---|
| 8,059,928 B2 | 11/2011 | Domm |
| 8,965,161 B2 | 2/2015 | Domm |
| 2007/0252918 A1 | 11/2007 | Furaya et al. |
| 2011/0216286 A1 | 9/2011 | Matsumoto et al. |
| 2012/0086917 A1 | 4/2012 | Okuda et al. |
| 2015/0236472 A1* | 8/2015 | Ide .......................... H01S 5/40 362/553 |
| 2016/0227199 A1* | 8/2016 | Gocke .................. H04N 9/3135 |

FOREIGN PATENT DOCUMENTS

| | | |
|---|---|---|
| JP | 3445047 B2 | 9/2003 |
| JP | 2010243590 A | 10/2010 |
| WO | 2016113490 A1 | 7/2016 |
| WO | 2016156759 A1 | 10/2016 |

OTHER PUBLICATIONS

International Search Report & Written Opinion from PCT/FR2018/050908, dated Aug. 9, 2018.

* cited by examiner

HIGH-POWER PROJECTOR WITH OFFSET LASER SOURCE

FIELD OF THE INVENTION

The present invention relates to the field of lighting and concerns more particularly the video/cinema projectors or the theater or show light projectors including a laser light source allowing a great lighting power.

PRIOR ART

Until a few years ago, the show light projectors traditionally consisted of an incandescent lamp or a discharge lamp of the type Xenon, Mercury, HMI or HTI, and of a reflector to direct the light bundle coming from this lamp towards an optical system including one or more lenses disposed one behind the other in the light bundle.

Recently, on the lighting market, in particular digital cinema and video lighting market, projectors have appeared, whose light sources, intended to replace these discharge or incandescent lamps, are LEDs or laser diodes, the latter being more particularly used when a large lighting power is aimed (typically light intensities greater than 10,000 lumens). These laser light sources are essentially divided into two types: the sources called Phosphorus sources and the sources called RGB sources.

The phosphorus sources are powered by blue laser diodes (430-470 nm approximately) and include a phosphor wheel to reconstitute the red and green colors. Their focal plane (generally comprised in a range from 4,000 to 5,000 microns) does not currently allow grouping several individual modules (today each limited to powers of the order ranging from 10,000 to 15,000 lumens) into one unless using mirror reflections that generate significant power losses. In addition, the phosphorus sources must be close to the projection engine (the video head including the light modulator) and the combination of several individual phosphorus sources therefore involves bulky, heavy, and noisy sets.

RGB sources, for their part, are powered by blue, green and red diodes. It is also easy to focus the bundles of several RGB diodes at a single point, the focal plane of the order ranging from 300 to 1000 microns allowing to collect the output light in a single fibre of the same diameter, the maximum diameter of a fibre currently being of the order of 1500 microns. By grouping several fibres into a single bundle, it is thus possible to generate significant powers. But this technique is restrictive and particularly expensive due in particular to the current one-piece constitution of the projectors.

These reasons make that today, the video/cinema or light projectors, are all power-limited.

OBJECT AND DEFINITION OF THE INVENTION

The present invention proposes to overcome this constraint with a projector allowing to deliver a high lighting power, typically from 15,000 to 60,000 lumens, or the same to discharge lamps ranging from 4 to 6 KW (of the type HMI—Xenon). Another aim of the invention is to be able to implement such a projector from any type of light source such as the RGB laser sources whose optical and mechanical tolerances are then released.

These aims are achieved by a projector including a plurality of laser light sources and a projection engine fitted, at the inlet, with an integrating tunnel, characterized in that said plurality of laser light sources is connected in an offset manner to the projection engine through a bundle of optical fibres including the same plurality of inlets and a single outlet, said bundle of fibres being fused at each of said inlets and said single outlet to eliminate the inter-fibre spaces therefrom and in that each of the inlets, fused in this way, of said plurality of inlets of the bundle of optical fibres is disposed at a focal plane of the output of each of the laser light sources of said plurality of laser light sources and said single outlet, fused in this way, of the bundle of optical fibres is placed in direct contact with the integrating tunnel via a homogenising plate.

Thus, by placing a bundle of optical fibres at the focal plane of the laser light source, it becomes possible to use any type of source and in particular a phosphorus source and by fusing these fibres, it is then possible to easily obtain a large numerical aperture and a high lighting power.

Preferably, the different fused inlets and the single fused outlet of the bundle of optical fibres each have a numerical aperture greater than 0.26 that can reach 0.37 and more.

Advantageously, the different fused inlets of the bundle of optical fibres each have a circular cross-section and the single fused outlet of the bundle of optical fibres has a rectangular cross-section. The diameter of the circular cross-section of each of the different fused inlets is greater than 4 mm.

Preferably, the circular cross-section has a diameter greater than the diameter of the focal plane of the output of the laser light source considered and the rectangular section has a length equal to or less than an inlet cross-section of the integrating tunnel.

Advantageously, the bundle of optical fibres includes several thousand to several tens of thousands of optical fibres with standard diameters comprised between 100 and 200 microns.

Preferably, the homogenising plate includes a diffusion angle comprised between 2 and 10°.

Advantageously, the homogenising plate is fastened on a support secured to the projection engine and sandwiched between the fused outlet of the bundle of optical fibres and the inlet of the integrating tunnel.

Preferably, the laser light sources are of the RGB or phosphorus type and the projection engine includes one of the following light modulators: DMD array, LCD array, tri-LCD arrays, Tri-DMD arrays, Lcos array and D-ILA array.

SHORT DESCRIPTION OF THE DRAWINGS

Figure 2:
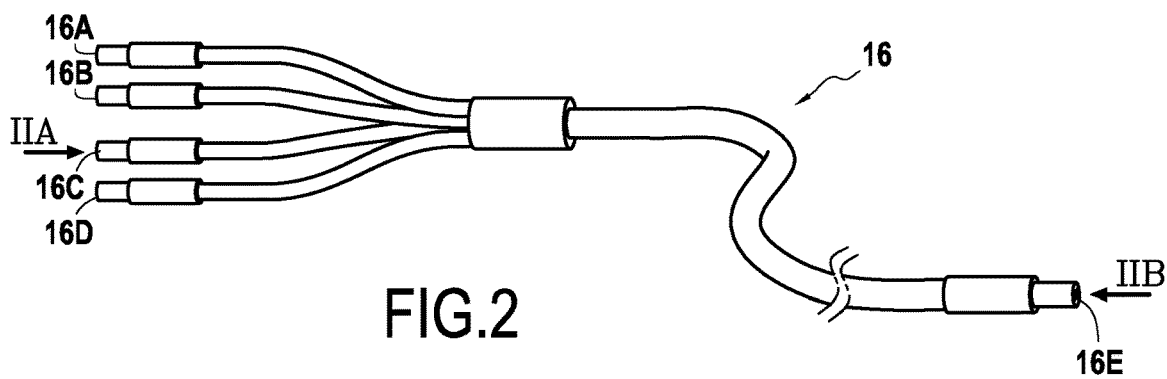
Figure 2A:
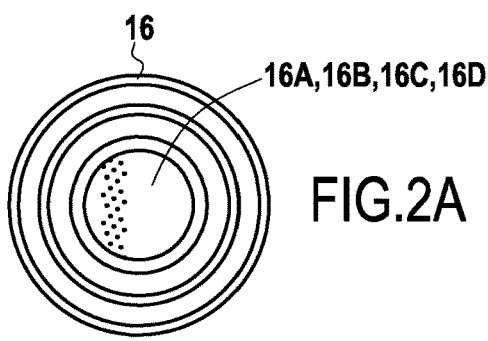
Figure 2B:
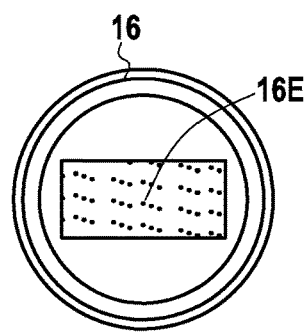
Figure 3:
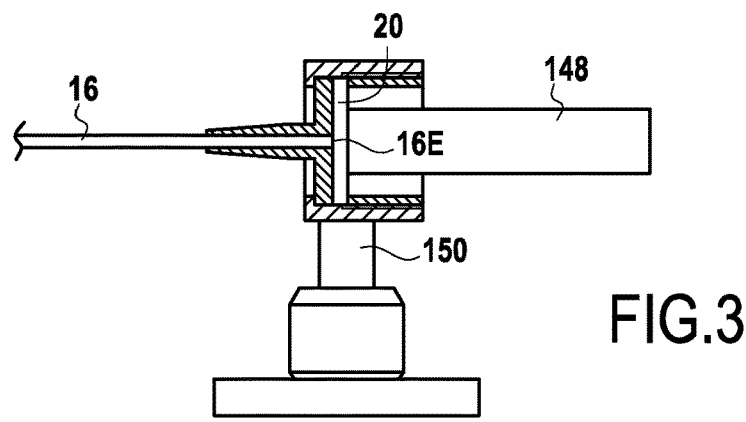

The characteristics and advantages of the present invention will better appear from the following description, which is indicative and non-restrictive, in relation to the appended drawings in which:

FIG. 1 is a block diagram of a projector with an offset light source in accordance with the invention, FIG. 2 is a detailed view of a bundle of optical fibres offsetting the laser light sources from the projection engine, FIGS. 2A and 2B are end views of a fused inlet and of the single fused outlet of the bundle of optical fibres in FIG. 2, and FIG. 3 illustrates the fastening of a homogenising plate relaying the single fused outlet of the bundle of optical fibres at the inlet of the projection engine.

DETAILED DESCRIPTION OF A PREFERRED EMBODIMENT

The invention is based on the principle of separating the laser light source, whether it is of the phosphorus or RGB type, from the projection engine by a bundle of optical fibres formed of several hundred to several thousand small standard optical fibres (100/200 microns) and whose bundle ends are fused to provide a large numerical aperture (ON of 0.37 and beyond), the inlet diameter of the bundle being adapted to the focal plane of the laser light source used (at least 4 mm for a phosphorus light source for example) and this bundle being preferably of very great length (up to several hundred meters) in order to allow an offset of the ventilation noise of the laser light sources.

The coupling of several light sources of small powers allows reaching light intensities equal to or greater than 60,000 lumens for video/cinema projectors, or optical powers equal to or greater than 4 to 6 kW for light projectors.

However, a simple grouping of standard optical fibres does not allow optimizing the efficiency due to the thickness of the sheaths that leaves interstices between the fibres causing a significant loss of efficiency. Also, the invention proposes to fuse the ends of these fibres.

At the inlet, by fusing several standard optical fibres into a single bundle of fibres, it becomes possible to achieve fibre diameters that cannot be obtained with a single fibre (the single fibres have diameters of 1500 microns maximum) and to combine a large wavelength range in the visible field (420-640 nm), which allows a relaxation of the optical and mechanical tolerances. At the outlet, this fusion creates a single-outlet bundle having an outlet section suitable for the inlet section of the condenser (or integrating rod) of the projection engine and which, by interposing a single diffuser/homogeniser between these two parts, allows optimizing the delivered power and the efficiency obtained. By fibre fusion is meant a grouping of several silica fibres into a single bundle. The bundles of silica fibres are fused at each end in order to eliminate the inter-fibre spaces, without using adhesives, or other types of materials whose inherent properties are limiting, while increasing the numerical aperture of the fibres (switching from an ON of 0.26 for a single fibre to 0.37 and more for a fused bundle). The bundles fused in this way at the ends (between these ends, the fibres remain independent of each other) generally increase the transmission by 50% and are used in applications with temperatures up to 1500° C.

FIG. 1 illustrates a projector structure in accordance with the present invention. This projector 10 is formed of three parts: one or a plurality of laser light sources 12, a projection engine 14 and a fused bundle of optical fibres 16 to ensure the transport of the white light from the light source to the projection engine thus offset from the source.

The laser light source 12 can be a phosphorus light source of the type of the one marketed by the Digital Projection UK Company and outputting a bundle of white light at a determined focal point. It may also be a laser light source RGB as described in the application WO2016/113490 or the application WO2016/156759, both filed on behalf of the Applicant and allowing to focus different light bundles coming from RGB diodes at a determined focal point at the output of this laser light source.

The projection engine 14 is usually organized around a light modulator 140, a prism 142 and an optical block 144 including in particular projection lenses 146 forming the lens of the projector. The light modulator is usually a DMD (digital micromirror device) array but other configurations can also be used such as an LCD, Lcos or D-ILA array and tri-LCD or tri-DMD arrays. Whatever the configuration chosen, an integrating tunnel or rod 148 is always present at the inlet of the optical path to ensure better alignment and spatial uniformity as in the lamp systems of the prior art.

The fused bundle of optical fibres 16 illustrated in more detail in FIG. 2 allows the coupling of one or a plurality of laser light sources depending on the power requirements.

In particular, the number of fused inlets 16A, 16B, 16C, 16D of the bundle depends on the total power required and on that of each of the phosphorus laser light sources or RGB. For example, a laser light source RGB of the type of the one described in the application WO2016/156759 above delivering an optical power ranging from 20 to 40 W (or more) per RGB color will allow obtaining a projection power ranging from 60 to 120 W or more per inlet, namely at the outlet, powers ranging from 240 to 480 W and more.

The inlet diameter of the bundle (see FIG. 2A) depends on the type of laser light source used and therefore on the dimensions of the focal plane. Thus, at least a 6 mm inlet diameter will be chosen for a phosphorus laser light source whose focal plane is comprised between 4 and 5 mm minimum. This inlet diameter will define the number of required fused fibres, from several hundred (namely about 400 fibres of 200 microns for a 4 mm diameter) to several thousand (namely about 3500 fibres of 100 microns for a 6 mm diameter) for a standard unit fibre diameter ranging from 100 to 200 microns for example.

Similarly, the size of the fused outlet bundle 16E depends on the total number of fused unit fibres (14,000 fibres in the immediately preceding four-inlet example) and on the section of the integrating tunnel 148. Finally, to increase the efficiency, the shape of the outlet bundle is adapted to that of the projection array (for example DMD chip) and therefore preferably with a rectangular section (see FIG. 2B) proportional to that of the array and having a length equal or less than the section of the integrating tunnel. However, an oval/elliptical section or any type of geometric shape, provided that the widest diameter is equal to or smaller than the section of the integrating tunnel, is also possible.

At the outlet of the fused fibre, a homogenising plate 20 intended to ensure a perfect color distribution and a perfect light distribution, is disposed in direct contact. It should be noted that the object of this homogenising plate is not to make the coherent light coming from the fused fibre "divergent", this divergence being ensured downstream through the prism of the projection engine, but to allow an even spreading of the luminous flux on the projection surface (95% centre/periphery of the projection surface).

As shown in FIG. 3, the homogenising plate, advantageously fastened on a support 150 secured to the projection engine, is sandwiched between the outlet of the fused fibre 16E and the inlet of the integrating tunnel 148. For the optimization of the luminous efficiency, it must have a diffusion angle comprised between 2° and 10° at the inlet of the integrating tunnel and must be able to accept a divergence angle of the fused fibre ranging from 6° to 15°. Such a homogenising plate is available, for example, under the reference RH-215-I-Y-A of the Holo-OR Ltd Company.

The configuration also obtained is simple with efficiencies 60 to 75% higher than those of the devices of the prior art while offering particularly low costs. It is subject to little constraint, only the alignment in the axis of the integrating tunnel is required and still with a sufficiently flexible tolerance. It should also be noted that this assembly allows physically shortening the length of this integrating tunnel.

The invention claimed is:

1. A projector including a plurality of laser light sources and a projection engine, the projection engine being fitted, at an inlet of the projection engine, with an integrating tunnel, wherein said plurality of laser light sources is connected in an offset manner to the projection engine through a bundle of optical fibres including a same plurality of inlets and a single outlet, said bundle of fibres being fused at each of said plurality of inlets forming fused inlets and at said single outlet forming a single fused inlet to eliminate interfibre spaces therefrom and in that each of said fused inlets of said plurality of inlets of the bundle of optical fibres is disposed at a focal plane of the output of each of the laser light sources of said plurality of laser light sources and said single fused outlet of the bundle of optical fibres is placed in direct contact with the integrating tunnel via a homogenising plate.

2. The projector according to claim 1, wherein each of the fused inlets and the single fused outlet of the bundle of optical fibres have a numerical aperture greater than 0.26.

3. The projector according to claim 1, wherein each of the fused inlets of the bundle of optical fibres have a circular cross-section and the single fused outlet of the bundle of optical fibres has a rectangular cross-section.

4. The projector according to claim 3, wherein the circular cross-section has a diameter greater than the diameter of the focal plane of the output of the laser light source considered.

5. The projector according to claim 4, wherein the diameter of the circular cross-section of each of the fused inlets is greater than 4 mm.

6. The projector according to claim 3, wherein the rectangular cross-section has a length equal to or less than an inlet cross-section of the integrating tunnel.

7. The projector according to any claim 1, wherein the bundle of optical fibres includes several thousand to several tens of thousands of optical fibres with a standard diameter comprised between 100 and 200 microns.

8. The projector according to claim 1, wherein the homogenising plate includes a diffusion angle comprised between 2 and 10°.

9. The projector according to claim 8, wherein the homogenising plate is fastened on a support secured to the projection engine and sandwiched between the single fused outlet of the bundle of optical fibres and an inlet of the integrating tunnel.

10. The lighting projector according to any claim 1, wherein said plurality of laser light sources is of the RGB or phosphorus type.

11. The projector according to any claim 1, wherein the projection engine includes one of the following light modulators: DMD array, LCD array, tri-LCD arrays, Tri-DMD arrays, Lcos array and D-ILA array.

* * * * *